(12) United States Patent
Becker et al.

(10) Patent No.: US 8,258,947 B2
(45) Date of Patent: Sep. 4, 2012

(54) AUTO-TRANSLATION OF SOURCE STRINGS IN GLOBAL VERIFICATION TESTING IN A FUNCTIONAL TESTING TOOL

(75) Inventors: Jennifer G. Becker, New Hill, NC (US); Kenneth Lee McClamroch, Chapel Hill, NC (US); VinodKumar Raghavan, Woburn, MA (US); Peter Sun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/569,560

(22) Filed: Sep. 29, 2009

(65) Prior Publication Data

US 2011/0074574 A1    Mar. 31, 2011

(51) Int. Cl.
    *G08B 21/00*    (2006.01)
(52) U.S. Cl. ........ 340/540; 340/541; 340/438; 340/439; 340/458; 340/7.49; 340/901; 340/13.34; 434/156; 434/167; 434/185; 704/241; 704/251; 704/253; 704/270
(58) Field of Classification Search .......... 340/540, 340/541, 438, 439, 458, 7.49, 9.1, 13.34; 434/156, 167, 185; 704/241, 251, 253, 270
See application file for complete search history.

(56) References Cited

U.S. PATENT DOCUMENTS

| | | | | |
|---|---|---|---|---|
| 5,857,173 | A | * | 1/1999 | Beard et al. ................ 704/276 |
| 7,542,893 | B2 | * | 6/2009 | Cancedda et al. ............ 704/2 |
| 8,033,831 | B2 | * | 10/2011 | Julia et al. ................. 434/185 |

OTHER PUBLICATIONS

Borland Software Corporation; "Borland Silk Test, The Quality Choice for Automated Regression and Functional Software Testing"; www.borland.com/us/products/silk/silktest/index.html?print=1; Last visited on May 22, 2009.

* cited by examiner

*Primary Examiner* — Tai T Nguyen
(74) *Attorney, Agent, or Firm* — Steve M. Greenberg, Esq.; Carey, Rodriguez, Greenberg & O'Keefe

(57) ABSTRACT

Embodiments of the present invention provide a method, system and computer program product for translation verification of source strings for controls in a target application graphical user interface (GUI). In an embodiment of the invention, a method for translation verification of source strings for controls in a target application GUI can include loading a target GUI for an application under test in a functional testing tool executing in memory by a processor of a computing system, retrieving different translated source strings in a target spoken language for respectively different control elements of the target GUI and, determining a score for each one of the translated source strings. Thereafter, an alert can be provided in the functional testing tool for each translated source string corresponding to a determined score failing to meet a threshold value, such as a score that falls below a threshold value, or a score that exceeds a threshold value.

18 Claims, 2 Drawing Sheets

AUTO-TRANSLATION OF SOURCE STRINGS IN GLOBAL VERIFICATION TESTING IN A FUNCTIONAL TESTING TOOL

BACKGROUND OF THE INVENTION

1. Field of the Invention

The present invention relates to the field of software functional testing and more particularly to global verification testing for source strings used when functional testing a user interface to a computer program.

2. Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

In operation, the conventional functional testing tool can monitor and record the interaction between end user and GUI during a recording phase of functional testing. In this regard, a testing script can be produced based upon the identity of GUI elements addressed by the end user and the sequence in which the GUI elements are addressed. Within the script, GUI elements, referred to herein as "objects", can be identified by absolute reference to each object. The absolute reference can include any number of element properties which, when combined with one another, can uniquely identify the desired object. Properties can include any explicit object property such as a data or method member, or any metadata associated with the object. Examples can include the class index, the accessible role, the object position, associated text, class name, and child and parent element identity, just to name a few.

Global verification testing (GVT) is an aspect of software testing in general that strives to validate translated strings in a specific spoken language for a computer program. Oftentimes, GVT for validating strings in a target GUI of an application under test is performed manually through the drafting of a script in a native spoken language of different use cases intended to traverse the target GUI to test usability while visually distinguishing translated elements of the target GUI. The manual validation of the target GUI for internationalization, however, is a tedious process and can be expensive to boot. Generally, the manual validation of the target GUI requires language experts cooperating with software developers in order to adequately test the functionality of the target GUI across different languages.

Recognizing the deficient nature of manually performing GVT, advanced functional testing tools provided for an automated GVT process. Exclusively, in automating GVT for functional testing, the functional testing tool requires the end user to provide Unicode formatted source strings for control elements in a source GUI of an application that can be subsequently encoded into different spoken languages for different locales in a target GUI for the application. Yet, to provide for Unicode formatted strings in functional testing also can be problematic and unnatural for those using the functional testing tool. As such, a need remains to provide for automated GVT in functional testing a GUI of an application under test using source strings encoded in a native spoken language.

BRIEF SUMMARY OF THE INVENTION

Embodiments of the present invention address deficiencies of the art in respect to GVT and provide a novel and non-obvious method, system and computer program product for translation verification of source strings for controls in a target application GUI. In an embodiment of the invention, a method for translation verification of source strings for controls in a target application GUI can include loading a target GUI for an application under test in a functional testing tool executing in memory by a processor of a computing system, retrieving different translated source strings in a target spoken language for respectively different control elements of the target GUI and, determining a score for each one of the translated source strings. Thereafter, an alert can be provided in the functional testing tool for each translated source string corresponding to a determined score failing to meet a threshold value, such as a score that falls below a threshold value, or a score that exceeds a threshold value.

In an aspect of the embodiment the method also can include as a pre-requisite to validating source strings translated into a target spoken language for control elements in a target GUI, translating source strings in a source spoken language into a target spoken language for respectively different control elements of a source GUI for the application under test using multiple different dictionaries. Each translated one of the source strings can be scored for goodness of translation based upon at least one scoring rule. Finally, each score can be stored in a match table in connection with a corresponding source string and a target spoken language. In this regard, determining a score for each one of the translated source strings can include mapping each one of the translated source strings to a score in the match table.

Of note, scoring each translated one of the source strings for goodness of translation based upon at least one scoring rule can include scoring each translated one of the source strings with a higher value in response to a translated one of the source strings resulting from an organizational dictionary, a lower value in response to a translated one of the source strings resulting from an industrial dictionary, and an even lower value in response to a translated one of the source strings resulting from a general dictionary. Additionally, scoring each translated one of the string strings for goodness of translation based upon at least one scoring rule can include scoring each translated one of the source strings with a higher value in response to a translated one of the source strings properly conforming to a grammar for the target spoken language. Even further, scoring each translated one of the string strings for goodness of translation based upon at least one scoring rule can include scoring each translated one of the source strings with a higher value in response to a translated one of the source strings resulting from one dictionary having a translation similar to another translation for the translated one of the source strings resulting from another dictionary.

In another embodiment of the invention, a translation validation data processing system can be configured for translation verification of source strings for controls in a target application GUI. The system can include a computing system with processor and memory, a functional testing tool executing in the memory by the processor of the computing system and a scoring module coupled to the functional testing tool and configured to score translated source strings for corresponding control elements of a target GUI for an application under test by the functional testing tool, according to at least one scoring rule. Finally, the system can include a validation engine coupled to the scoring module.

The validation engine can include program code enabled to validate only translated sources strings for corresponding control elements in the target GUI having a score failing to meet a threshold value. Optionally, a translator can be coupled to the functional testing tool and configured for coupling to different dictionaries for translation of source strings over a computer communications network. For instance, the dictionaries can include an organizational dictionary, an industrial dictionary and a general dictionary. As such, the scoring rules can include a rule scoring a translation of a source string at a higher value when translated according to the organizational dictionary, a lower value when translated according to the industrial dictionary, and an even lower value when translated according to the general dictionary. Additionally, the scoring rules can include a rule scoring a translation of a source string at a higher value when translated similarly according to at least two of the dictionaries. As yet another option, the scoring rules can include a rule scoring a translation of a source string at a higher value when translated into a grammatical form consistent with grammatical rules for the target spoken language, and at a lower value when translated into a grammatical form inconsistent with grammatical rules for the target spoken language.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for translation verification of source strings for controls in a target application GUI during functional testing. In accordance with an embodiment of the present invention, source strings for respective user interface controls (control elements) in a source GUI of an application under test can be translated from a source spoken language into one or more target spoken languages. The translation of the source strings into each target spoken language can be performed by reference to one or more different dictionaries, ranging from an organizational dictionary of organizational terms, to an industrial dictionary of industrial terms, to a general dictionary of terms. The relevance of each translated source string for each target spoken language can be scored according to scoring rules such as a particular one of the dictionaries from which the translated source string had been determined, conformance with grammar rules for the target spoken language, or matching translations for a target spoken language of a source term from different ones of the dictionaries, to name a few possibilities.

Subsequently, already translated source strings for different control elements in a target GUI for an application under test in a functional testing tool can be retrieved with respect to a target spoken language. Previously stored scores for the translated source strings in the target spoken language can be located and, to the extent that a translated source string has a located score that falls below a minimum threshold, the translated source string can be visually emphasized in the target GUI to indicate a potential failure of validation of the translated source string. In this way, the process of validating translated source strings in a target GUI of an application under test during functional testing can be automated without the need for coding the source strings in the source GUI of the application under test in Unicode, and without the need to entertain a tedious manual validation exercise.

Figure 1:
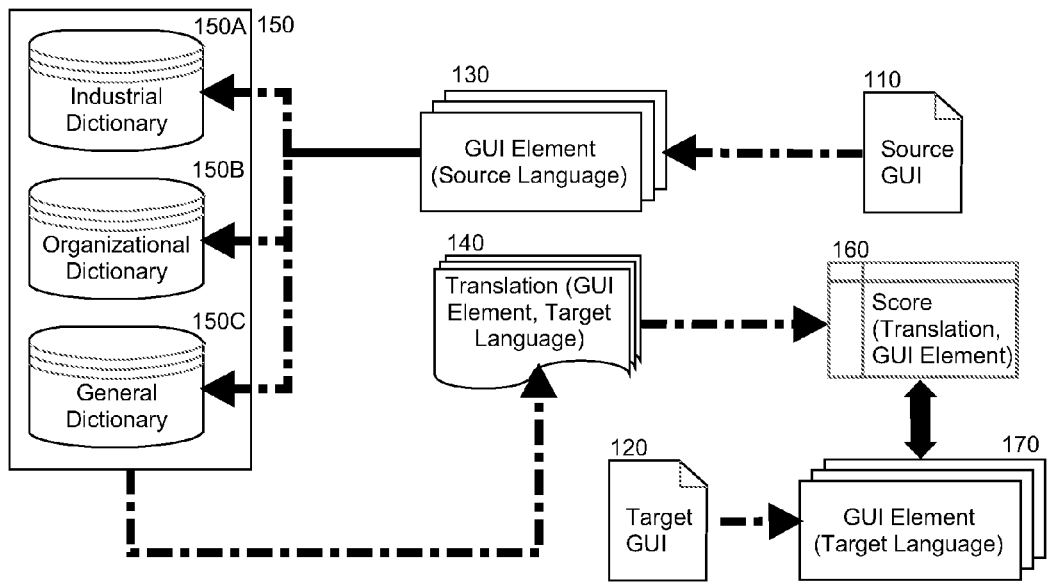
FIG. 1 is a pictorial illustration of a process for translation verification of source strings for controls in a target application GUI during functional testing.

In further illustration, FIG. 1 is a pictorial illustration of a process for translation verification of source strings for controls in a target application GUI during functional testing. As shown in FIG. 1, source strings control elements 130 such as button labels, menu item entries, and static text fields, each from a source GUI 110 for an application under test can be extracted in a source spoken language and subjected to a translation process 140 for a target spoken language utilizing different dictionaries 150. The dictionaries 150 can include an industrial dictionary 150A of term translations for terms of art in a particular industry, an organizational dictionary 150B of term translations for terms common to a particular organization such as a company, and a general dictionary 150C of term translations without respect to a particular organization or industry.

Each translated source string for a corresponding one of the control elements 130 can be scored in respect to the translation from the source spoken language to the target spoken language. Each score in turn can be stored in a match table in a data store of scores 160 organized by source string, source spoken language, and target spoken language. The data store of scores 160 can include scores computed according to a number of different scoring rules, such as providing a higher value to a translation sourced from an organizational dictionary 150B, a somewhat lower value to a translation sourced from an industrial dictionary 150A, and an even lower value to a translation sourced from a general dictionary 150C. The scoring rules additionally can include providing a higher score to translations from the different dictionaries 150 that agree with one another, grammar rules of word ordering for a target spoken language, or rules of idioms for a target spoken language present in a translation.

Thereafter, during validation of a target GUI 120 for the application under test in a functional testing tool, source strings for control elements 170 such as button labels, menu item entries, and static text fields, each from the target GUI 120 for the application under test can be extracted in a target spoken language. The data store of scores 160 can be consulted for each of the source strings of the control elements 170 to retrieve scores for corresponding ones of the source strings of the control elements 170 reflecting a measured "goodness" of the translation reflected by the source strings of the control elements 170. Control elements 170 with source strings resulting in a score that falls below a threshold value can be flagged as invalid and can fail validation. In this regard, the end user can be visually cued to each of the control elements 170 failing validation by way of an emphasized visual display of each failing one of the control elements 170.

Figure 2:
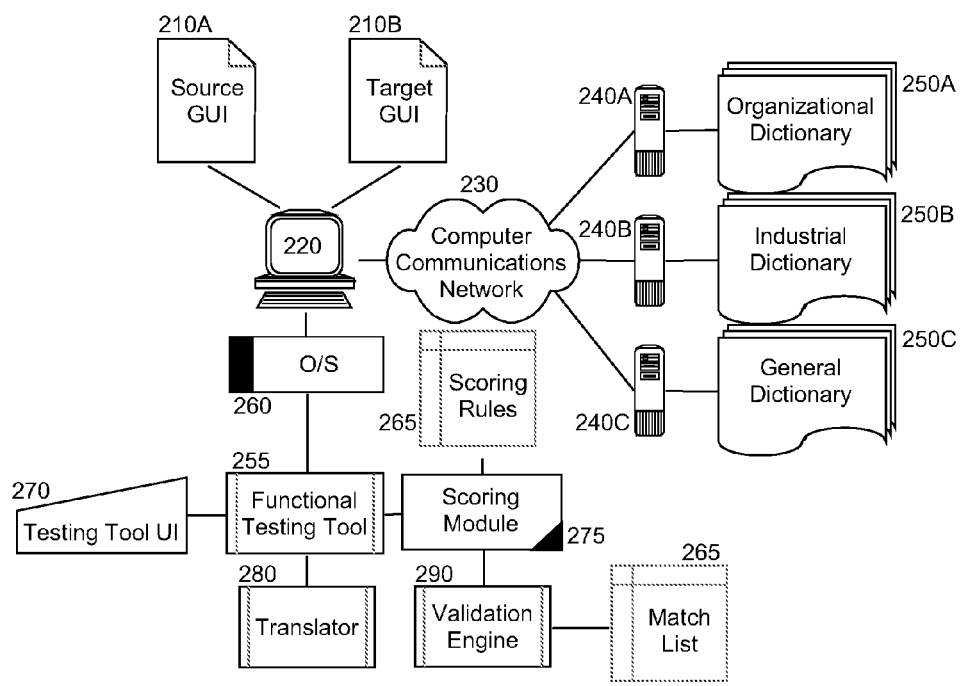
FIG. 2 is a schematic illustration of a functional testing data processing system configured for translation verification of source strings for controls in a target application GUI; and, FIGS. 3A and 3B, taken together, are a flow chart illustrating a process for translation verification of source strings for controls in a target application GUI during functional testing.

The process described in connection with FIG. 1 can be implemented in a functional testing data processing system. In yet further illustration, FIG. 2 is a schematic illustration of a functional testing data processing system configured for translation verification of source strings for controls in a target application GUI. The system can include a host computing system 220 with processor and memory supporting the execution of an operating system 260 by the processor of the host computing system 220. The host computing system 220 can be configured for communicative coupling to one or more servers 240A, 240B, 240C over computer communications network 230, each of the servers 240A, 240B, 240C providing access to a corresponding dictionary 250A, 250B, 250C.

The operating system 260 can host the operation of a functional testing tool 255 configured to perform functional testing of a target GUI 210B for an application under test with reference to a pre-recorded set of user interface interactions established with respect to a source GUI 210A for the application under test. The functional testing tool 255 can include a testing tool user interface 270 through which the results of the functional testing of the target GUI 210B can be presented to an end user.

Of note, a translator 280 can be coupled to the functional testing tool 255. The translator 280 can be a program module or plug-in to the functional testing tool 255 configured to translate source strings for control elements of the source GUI 210 from a source spoken language to a target spoken language using the dictionaries 250A, 250B, 250C. Further, a scoring module 275 can compute a score for each translated source string according to scoring rules 265 and can store the computed scores in a match list 265 of scores in reference to associated translated source strings and a target spoken language.

The scoring rules 265, by way of example, can provide differing scores to translations of the source strings from the source spoken language to the target spoken language based upon whether the translation is sourced from an organizational dictionary 250A, industrial dictionary 250B or general dictionary 250C, a higher score being associated with a translation sourced from an organizational dictionary 250A and a lower score being associated with a translation sourced from a general dictionary 250C. Additionally, enhanced scores can be associated with translated source strings where multiple different translations from different ones of the dictionaries 250A, 250B, 250C are similar. Correct grammatical structure of the translated source strings further can enhance the scores for the translated source strings.

Finally, a validation engine 290 can be coupled to each of the scoring module 275 and the match list 265. The validation engine 290 also can be a plug-in to the functional testing tool 255. The validation engine 290 can include program code operable upon execution by the processor of the computing system 220 to perform GVT on the target GUI 210B. Specifically, the program code can be enabled to locate in the match list 265 a score for each translated source string in the target spoken language for the control elements of the target GUI 210B. The program code further can be enabled to visually emphasize a corresponding control element in the target GUI 210B for a translated source string responsive to the located score for the translated source string falling below a pre-determined threshold value indicating a failure of validation.

Figure 3A:
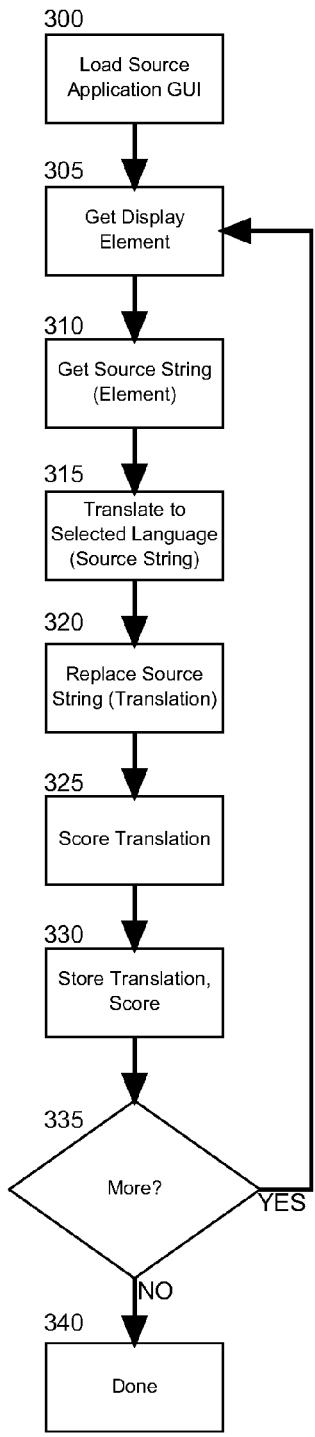
Figure 3B:
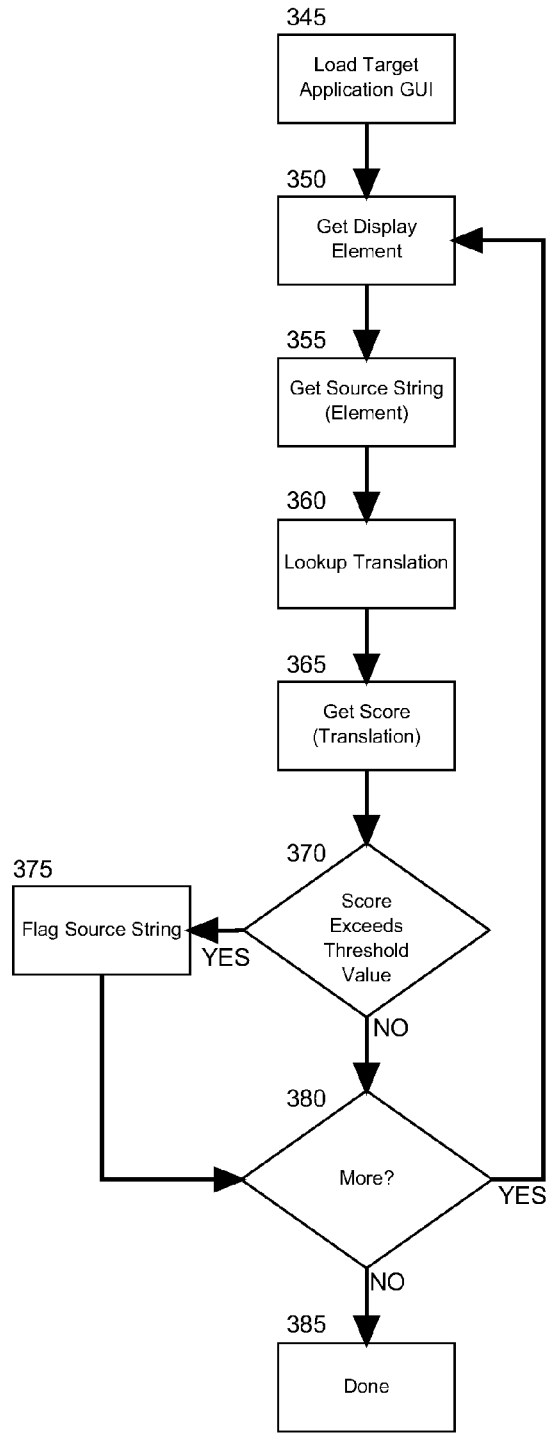

In yet further illustration of the operation of the system of FIG. 2, FIGS. 3A and 3B, taken together, are a flow chart illustrating a process for translation verification of source strings for controls in a target application GUI during functional testing. Beginning first in block 300 of FIG. 3A, a source GUI for an application under test can be loaded and in block 305, a control element in the source GUI can be selected for processing. In block 310, a source string for the control element can be retrieved and translated from a source spoken language of the source string to a target spoken language in block 315 according to one or more dictionaries, such as an organizational dictionary, an industrial dictionary, or a general dictionary. Thereafter, the source string of the control element can be replaced with the translation in block 320.

In block 325, the translation can be scored according to one or more scoring rules and in block 330 the score for the translation can be stored in a match table with reference to the translation and target spoken language. In decision block 335, if additional control elements in the source GUI remain to be translated and scored, the process can return to block 305 in which a different control element can be retrieved for translation and scoring. Otherwise, the process can end in block 340, the match table having been populated with a set of translations for a target spoken language and corresponding scores.

Turning now to FIG. 3B, in block 345, a target GUI for the application under test can be loaded for validation. The control elements of the target GUI can include previously translated source strings into a target spoken language. In block 350, a control element in the target GUI can be selected for processing and in block 355 a source string for the control element can be retrieved. In block 360, the translation reflected by the source string can be mapped in the match table to a score and in block 365 the score can be retrieved for the translation. In decision block 370, it can be determined whether or not the score exceeds a threshold value. If no, in block 375 the control element corresponding to the source string can be visually emphasized or otherwise flagged as having failed validation.

In decision block 380, if additional control elements in the target GUI remain to be translated and scored, the process can return to block 350 in which a different control element can be retrieved for validation. Otherwise, the process can end in block 385, the target GUI having been validated without requiring the manual intervention by a language expert or the intermediate coding of the source strings in Unicode rather than a source spoken language.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for translation verification of source strings for controls in a target application graphical user interface (GUI), the method comprising:
   loading a target GUI for an application under test in a functional testing tool executing in memory by a processor of a computing system;
   retrieving different translated source strings in a target spoken language for respectively different control elements of the target GUI;
   determining a score for each one of the translated source strings; and,
   providing an alert in the functional testing tool for each translated source string corresponding to a determined score failing to meet a threshold value.

2. The method of claim 1, further comprising:
   translating source strings in a source spoken language into a target spoken language for respectively different control elements of a source GUI for the application under test using multiple different dictionaries;
   scoring each translated one of the source strings for goodness of translation based upon at least one scoring rule; and,
   storing each score in a match table in connection with a corresponding source string and a target spoken language.

3. The method of claim 2, wherein determining a score for each one of the translated source strings, comprises mapping each one of the translated source strings to a score in the match table.

4. The method of claim 2, wherein scoring each translated one of the source strings for goodness of translation based upon at least one scoring rule, comprises:
   scoring each translated one of the source strings with a higher value in response to a translated one of the source strings resulting from an organizational dictionary, a lower value in response to a translated one of the source strings resulting from an industrial dictionary, and an even lower value in response to a translated one of the source strings resulting from a general dictionary.

5. The method of claim 2, wherein scoring each translated one of the string strings for goodness of translation based upon at least one scoring rule, comprises:
   scoring each translated one of the source strings with a higher value in response to a translated one of the source strings properly conforming to a grammar for the target spoken language.

6. The method of claim 2, wherein scoring each translated one of the string strings for goodness of translation based upon at least one scoring rule, comprises:
   scoring each translated one of the source strings with a higher value in response to a translated one of the source strings resulting from one dictionary having a translation similar to another translation for the translated one of the source strings resulting from another dictionary.

7. A translation validation data processing system configured for translation verification of source strings for controls in a target application graphical user interface (GUI), the system comprising:
   a computing system with processor and memory;
   a functional testing tool executing in the memory by the processor of the computing system;
   a scoring module coupled to the functional testing tool and configured to score translated source strings for corresponding control elements of a target GUI for an application under test by the functional testing tool, according to at least one scoring rule; and,
   a validation engine coupled to the scoring module, the validation engine comprising program code enabled to validate only translated sources strings for corresponding control elements in the target GUI having a score failing to meet a threshold value.

8. The system of claim 7, further comprising a translator coupled to the functional testing tool and configured for coupling to a plurality of dictionaries for translation of source strings over a computer communications network.

9. The system of claim 8, wherein the dictionaries comprise an organizational dictionary, an industrial dictionary and a general dictionary.

10. The system of claim 9, wherein the scoring rules comprises a rule scoring a translation of a source string at a higher value when translated according to the organizational dictionary, a lower value when translated according to the industrial dictionary, and an even lower value when translated according to the general dictionary.

11. The system of claim 8, wherein the scoring rules comprises a rule scoring a translation of a source string at a higher value when translated similarly according to at least two of the dictionaries.

12. The system of claim 7, wherein the scoring rules comprises a rule scoring a translation of a source string at a higher value when translated into a grammatical form consistent with grammatical rules for the target spoken language, and at a lower value when translated into a grammatical form inconsistent with grammatical rules for the target spoken language.

13. A computer program product comprising a non-transitory computer readable storage medium embodying computer usable program code for translation verification of source strings for controls in a target application graphical user interface (GUI), the computer program product comprising:
   computer readable program code for loading a target GUI for an application under test in a functional testing tool executing in memory by a processor of a computing system;
   computer readable program code for retrieving different translated source strings in a target spoken language for respectively different control elements of the target GUI;

computer readable program code for determining a score for each one of the translated source strings; and, computer readable program code for providing an alert in the functional testing tool for each translated source string corresponding to a determined score failing to meet a threshold value.

14. The computer program product of claim 13, further comprising:

computer readable program code for translating source strings in a source spoken language into a target spoken language for respectively different control elements of a source GUI for the application under test using multiple different dictionaries;

scoring each translated one of the source strings for goodness of translation based upon at least one scoring rule; and, storing each score in a match table in connection with a corresponding source string and a target spoken language.

15. The computer program product of claim 14, wherein the computer readable program code for determining a score for each one of the translated source strings, comprises computer usable program code for mapping each one of the translated source strings to a score in the match table.

16. The computer program product of claim 14, wherein the computer readable program code for scoring each translated one of the source strings for goodness of translation based upon at least one scoring rule, comprises:

computer readable program code for scoring each translated one of the source strings with a higher value in response to a translated one of the source strings resulting from an organizational dictionary, a lower value in response to a translated one of the source strings resulting from an industrial dictionary, and an even lower value in response to a translated one of the source strings resulting from a general dictionary.

17. The computer program product of claim 14, wherein the computer readable program code for scoring each translated one of the string strings for goodness of translation based upon at least one scoring rule, comprises:

computer readable program code for scoring each translated one of the source strings with a higher value in response to a translated one of the source strings properly conforming to a grammar for the target spoken language.

18. The computer program product of claim 14, wherein the computer readable program code for scoring each translated one of the string strings for goodness of translation based upon at least one scoring rule, comprises:

computer readable program code for scoring each translated one of the source strings with a higher value in response to a translated one of the source strings resulting from one dictionary having a translation similar to another translation for the translated one of the source strings resulting from another dictionary.

* * * * *